Patented Mar. 29, 1932

1,851,121

UNITED STATES PATENT OFFICE

RICHARD STÜSSER, OF COLOGNE-DEUTZ, GERMANY, ASSIGNOR TO GENERAL ANILINE WORKS, INC., OF NEW YORK, N. Y., A CORPORATION OF DELAWARE

SUBSTANTIVE AZO DYESTUFFS

No Drawing. Application filed February 28, 1928, Serial No. 257,789, and in Germany March 10, 1927.

The present invention concerns new disazo dyestuffs.

I have found that by coupling tetrazotized 4.4'-diamino-diphenyl-3.3'-dicarboxylic acid with two coupling components, each of which contains groups causing solubility in water, such as sulfonic acid- and carboxylic acid-groups, at least one of the coupling components being a N-phenyl-naphthylamine-sulfonic acid, which may be otherwise substituted by hydroxyl, new dyestuffs are obtainable which in the free form probably have the general formula

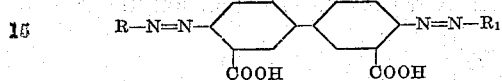

wherein R and R₁ stand for the residues of coupling components of the naphthalene and benzene series, each of which contain groups causing solubility in water at least one of the coupling components being a N-phenyl-naphthylamine sulfonic acid, which may be otherwise substituted by hydroxyl. The new dyestuffs are in the form of their alkali metal salts dark powders which dissolve in strong sulfuric acid with red to black colorations. They exhibit a good solubility in water, especially in calcareous water and dye cotton and regenerated cellulose red to green shades which become fast to water, washing and light, when aftertreated with suitable metal salts such as copper-, cobalt-, chromium-salts and the like. On treatment with stannous chloride and hydrochloric acid the new dyestuffs yield among other products 4.4'-diamino-diphenyl-3.3'-dicarboxylic acid.

The following examples illustrate my invention without limiting it thereto:—

*Example 1.*—272 parts by weight 4:4'-diamino-diphenyl-3:3'-dicarboxylic acid are tetrazotized in the known manner and coupled with 630 parts by weight of 8-hydroxy-1-phenylamino-naphthalene-4-sulfonic acid in a solution rendered alkaline with sodium carbonate and in the presence of pyridine. The coupling mixture is finally heated to about 40° C., and the dyestuff having in the free state the following formula:

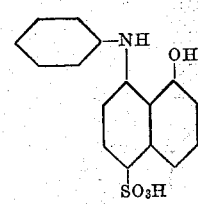 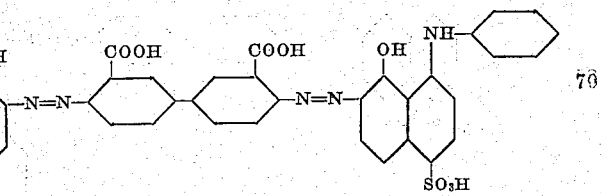

is salted out and dried. It appears as a black powder, which dyes cotton blue shades. By after-treatment with copper salts the dyeings become more greenish and at the same time fast to washing and light.

*Example 2.*—272 parts by weight of 4.4'-diamino diphenyl-3:3'-dicarboxylic acid are tetrazotized and coupled with 315 parts by weight of 5-hydroxy-2-phenyl-naphthylamine-7-sulfonic acid in alkaline bicarbonate solution. The intermediate product is filtered and coupled with 224 parts by weight of 1-hydroxy-naphthalene-5-sulfonic acid in a solution rendered alkaline with sodium carbonate and in the presence of pyridine. In order to complete the coupling, the mixture is heated to about 40° C., the resulting dyestuff having in the free state the following formula:

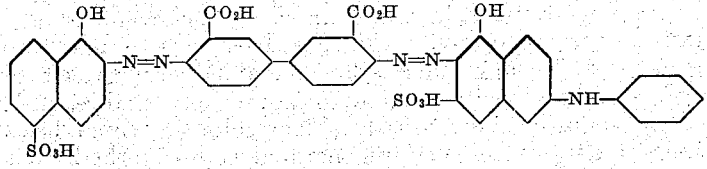

is salted out, filtered and dried. It appears as a black powder, which dissolves in water with a bluish red coloration and dyes cotton and regenerated cellulose reddish violet shades. By after-treatment of the dyeing with copper salts a blue violet is obtained, fast to washing and light. On treatment with stannous chloride and hydrochloric acid, the dyestuff yields 4.4'-diamino-diphenyl-3.3'-dicarboxylic acid, 1-hydroxy-2-amino naphthalene-5-sulfonic acid and 1-hydroxy-2-amino-6-phenyl amino-naphthalene-3-sulfonic acid.

*Example 3.*—272 parts by weight of 4:4'-diamino diphenyl-3:3'-dicarboxylic acid are tetrazotized and coupled with 315 parts by weight of 8-hydroxy-1-phenyl amino-naphthalene-4-sulfonic acid in alkaline bicarbonate solution. When the formation of the intermediate product is complete, a solution of 287 parts by weight of sulfo-aceto acetic acid-ortho-anisidide is added. The mixture is rendered alkaline with sodium carbonate and heated to about 40° C. until coupling is complete; the dyestuff is salted out, filtered and dried. It forms a black powder which dissolves readily in water with a greyish blue coloration. In its free state it has the following formula:

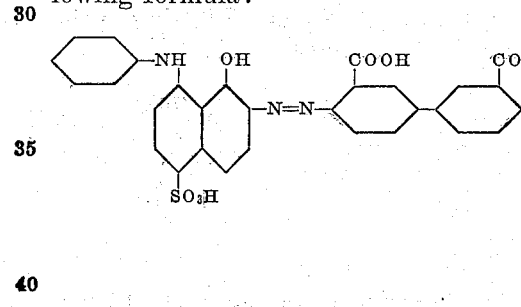

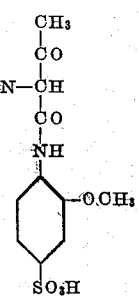

On dyeing cotton a greyish blue shade is obtained, which on after-treatment with copper salts, changes to a clear green fast to washing and light.

I claim:—

1. Disazo dyestuffs having in their free form the general formula

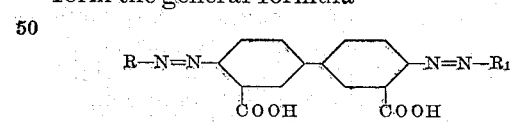

wherein R and $R_1$ stand for the residues of coupling components of the benzene or naphthalene series, containing sulfonic or carboxylic acid groups at least one of the coupling components being a N-phenyl-naphthylamine-sulfonic acid, which may be otherwise substituted by hydroxyl, said dyestuffs being in the form of their alkali metal salts dark powders, easily soluble in water and strong sulfuric acid with red to black colorations, dyeing cotton and regenerated cellulose red to green shades, which become fast to water, washing and light by after-treatment with suitable metal salts, yielding when treated with stannous chloride and hydrochloric acid among other products 4.4'-diamino-diphenyl-3.3'-dicarboxylic acid.

2. Disazo dyestuffs having in their free form the general formula

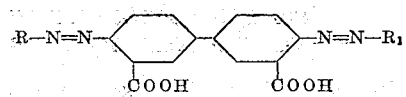

wherein R represents the residue of a N-phenyl-naphthylamine-sulfonic acid, which may be substituted by hydroxyl, $R_1$ stands for the residue of any other coupling component of the benzene or naphthalene series containing a sulfonic or carboxylic acid group, said dyestuffs being in the form of their alkali metal salts dark powders, easily soluble in water and strong sulfuric acid with red to black colorations, dyeing cotton and regenerated cellulose red to green shades, which become fast to water, washing and light by after-treatment with suitable metal salts, yielding when treated with stannous chloride and hydrochloric acid among other products 4.4'-diamino-diphenyl-3.3'-dicarboxylic acid.

3. Disazo dyestuffs having in their free form the general formula

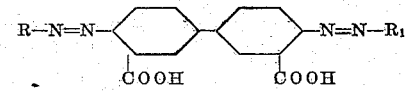

wherein R stands for the residue of the coupling component

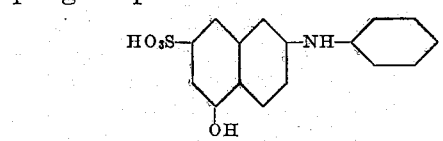

$R_1$ stands for a residue of any other coupling component of the benzene or naphthalene series containing a sulfonic or carboxylic acid group, said dyestuffs being in the form of their alkali metal salts dark powders, easily soluble in water and strong sulfuric acid with red to black colorations, dyeing cotton and regenerated cellulose red to green shades, which become fast to water, washing and light by after-treatment with suitable metal salts, yielding when treated with stannous chloride and hydrochloric acid among others 4.4'-diamino-diphenyl-3.3'-dicarboxylic acid and 1-hydroxy-2-amino-6-phenylamino-naphthalene-3-sulfonic acid 4. The disazo dyestuff having in its free form the probable formula

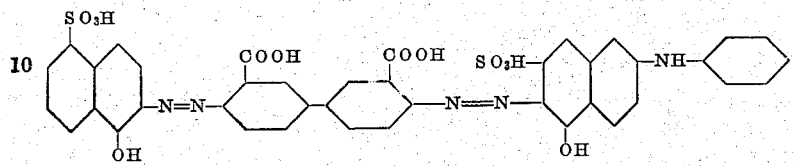

said dyestuff being in the form of its alkali metal salts a black powder, dissolving in water and strong sulfuric acid with a bluish-red coloration, dyeing cotton and regenerated cellulose reddish violet shades which change to a blue-violet fast to washing and light by after-treatment with copper salts, yielding on treatment with stannous chloride and hydrochloric acid 4.4'-diamino-diphenyl-3.3'-dicarboxylic acid, 1-hydroxy-2-amino-5-sulfonic acid and 1-hydroxy-2-amino-6-phenylamino-naphthalene-3-sulfonic acid.

In testimony whereof I have hereunto set my hand.

RICHARD STÜSSER.